United States Patent
Bux et al.

(10) Patent No.: US 9,366,477 B2
(45) Date of Patent: Jun. 14, 2016

(54) PROCESS FOR DRYING SLUDGE

(71) Applicant: TSP GMBH, Filderstadt-Bernhausen (DE)

(72) Inventors: Markus Bux, Pliezhausen (DE); Steffen Ritterbusch, Stuttgart (DE); Tilo Conrad, Nürtingen (DE)

(73) Assignee: TSP GmbH, Filderstadt-Bernhausen (DE)

( * ) Notice: Subject to any disclaimer, the term of this patent is extended or adjusted under 35 U.S.C. 154(b) by 112 days.

(21) Appl. No.: 14/363,524

(22) PCT Filed: Dec. 10, 2012

(86) PCT No.: PCT/EP2012/074950
§ 371 (c)(1),
(2) Date: Jun. 6, 2014

(87) PCT Pub. No.: WO2013/083837
PCT Pub. Date: Jun. 13, 2013

(65) Prior Publication Data
US 2015/0233635 A1    Aug. 20, 2015

(30) Foreign Application Priority Data

| Dec. 9, 2011 | (DE) | ................ | 10 2011 088 174 |
| Jan. 5, 2012 | (DE) | ................ | 10 2012 200 144 |
| Jan. 24, 2012 | (DE) | ................ | 10 2012 001 166 |
| Feb. 8, 2012 | (DE) | ................ | 10 2012 201 846 |

(51) Int. Cl.
| F26B 25/12 | (2006.01) |
| F26B 3/28 | (2006.01) |
| F26B 9/10 | (2006.01) |
| F26B 23/00 | (2006.01) |
| C02F 11/16 | (2006.01) |

(52) U.S. Cl.
CPC . *F26B 3/28* (2013.01); *C02F 11/16* (2013.01); *F26B 9/103* (2013.01); *F26B 23/00* (2013.01)

(58) Field of Classification Search
CPC ................ F26B 3/00; F26B 3/08; F26B 5/00; F26B 11/00; F26B 25/00; F26B 25/04; C02F 11/00; C02F 11/02
USPC ......... 34/365, 380, 381, 90; 210/603, 170.01, 210/170.08; 44/497, 593
See application file for complete search history.

(56) References Cited

U.S. PATENT DOCUMENTS

| 4,670,240 | A | * | 6/1987 | Barber | .................... | C22B 1/245 |
| | | | | | | 423/322 |
| 8,468,714 | B2 | * | 6/2013 | Conrad | .................... | F26B 1/00 |
| | | | | | | 118/696 |
| 2005/0247245 | A1 | | 11/2005 | Ramharter et al. | | |
| 2010/0192401 | A1 | | 8/2010 | Stanke et al. | | |
| 2011/0232343 | A1 | * | 9/2011 | Mantelatto | .............. | C13B 10/12 |
| | | | | | | 71/11 |
| 2012/0168388 | A1 | | 7/2012 | Conrad et al. | | |
| 2013/0167603 | A1 | * | 7/2013 | Bathurst | ................ | C10G 1/047 |
| | | | | | | 71/23 |
| 2015/0233635 | A1 | * | 8/2015 | Bux | .......................... | F26B 3/28 |
| | | | | | | 34/522 |

FOREIGN PATENT DOCUMENTS

| DE | 196 44 465 C2 | 6/2002 | | |
| DE | 298 25 058 U1 | 8/2004 | | |
| DE | 10 2004 051 975 B3 | 4/2006 | | |
| DE | 10 2009 033 028 A1 | 1/2011 | | |
| DE | 102009033028 A1 | * | 1/2011 | ............... F26B 1/00 |
| DE | WO 2011000589 A1 | * | 1/2011 | ............... F26B 1/00 |
| DE | 2389554 B1 | * | 1/2013 | ............... F26B 1/00 |
| EP | 1 621 523 A1 | 2/2006 | | |
| WO | WO 2004/046629 A1 | 6/2004 | | |
| WO | WO 2007/147181 A1 | 12/2007 | | |

OTHER PUBLICATIONS

International Search Report issued in PCT/EP2012/074950, mailed on Apr. 3, 2013.
English translation of the International Preliminary Report on Patentability issued in PCT/EP2012/074950, dated Jun. 9, 2014.

* cited by examiner

*Primary Examiner* — Stephen M Gravini
(74) *Attorney, Agent, or Firm* — Birch, Stewart, Kolasch & Birch, LLP

(57) ABSTRACT

The invention relates to a process for drying sludge having the following steps: a) applying a sludge having a dry matter content of 15% to 30% to a floor of a drying hall (10), or sludge already present, b) predrying the sludge in the drying hall (10), wherein the sludge is mixed, c) introducing at least a part of the predried sludge into a heated thermal dryer (12), wherein the sludge introduced in each case into the thermal dryer (12) is replaced in the drying hall (10), by carrying out the step a), by a sludge having a dry matter content of 15% to 30% which then likewise passes through step b), d) drying the sludge in the thermal dryer (12) to a dry matter content of 80% to 95%, wherein air (14) taking up moisture from the sludge flows over or through the sludge, wherein the air (14) is brought to a temperature in a range from 70° C. to 160° C., or wherein, by heating the sludge, water vapor is liberated from the sludge, wherein the sludge, after achieving the dry matter content of 80% to 95%, is discharged from the thermal dryer (12), wherein the sludge discharged from the thermal dryer in each case is replaced by predried sludge by carrying out step c), which predried sludge then likewise passes through step d), e) passing the air (14) heated in step d), or the water vapor through a first region of a heat exchanger (17), through which ambient air (16) passes in a second region, wherein the air (14) heated in step d) or the water vapor releases heat to the ambient air (16), with condensation of the moisture present in the heated air or in the water vapor, wherein the heated air (14) or the water vapor is cooled to a temperature in the range from 10° C. to 60° C., and the ambient air (16) is heated to a temperature at most 40 K above the ambient temperature and the former temperature is at most 50° C., and f) promoting the predrying according to step b) by introducing the ambient air (18) heated in step e) into the drying hall (10), in such a manner that the ambient air (16) flows onto or over the surface of the sludge applied to the floor of the drying hall (10).

20 Claims, 1 Drawing Sheet

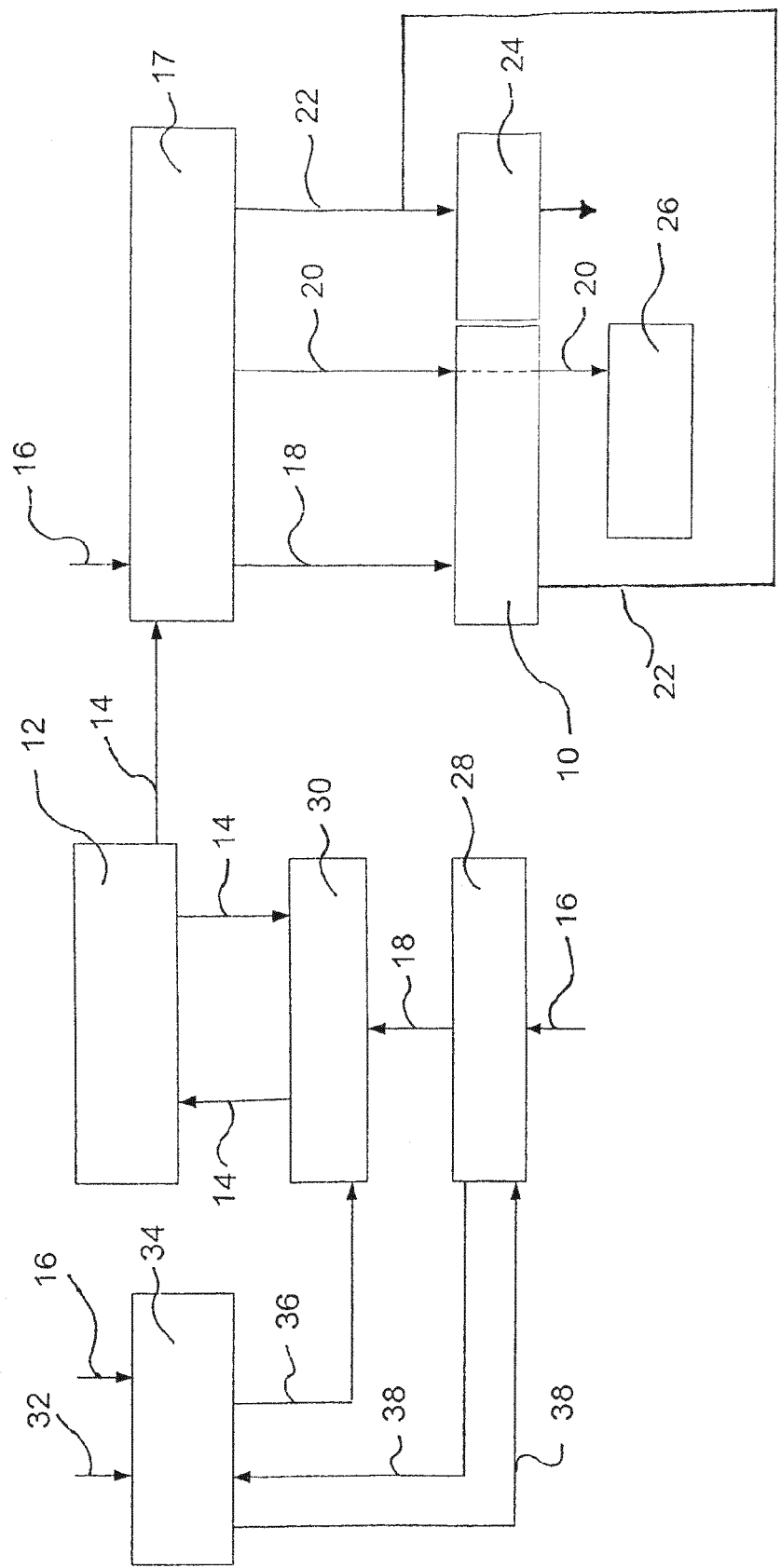

PROCESS FOR DRYING SLUDGE

The invention relates to a process for drying sludge, in particular sewage sludge.

Such a process is known from DE 196 44 465 C2. In this process water or water vapor is withdrawn by means of low pressure or exposure to vacuum from the material that is to be dried and the water vapor that is withdrawn is condensed. The condensation energy liberated thereby is fed as recovered energy in the form of heat energy to a conduit circuit in which the material that is to be dried is transported. The recovered condensation energy can be used here for predrying and/or afterdrying. A first drying region is used for predrying and afterdrying and a second drying region is used for main drying and afterdrying. The predrying and the main drying proceed simultaneously in the two drying regions. In this case a thermal medium is first conducted through the second drying region and then through the first drying region against the direction of transport of the material that is to be dried. The condensation of the water vapor can be promoted by compressing. This is structurally complex and consumes a relatively large amount of energy. Owing to the reduced pressure to be generated for the drying in the second drying region, a device for carrying out the process may also only be provided having relatively high structural expenditure, and carrying out the main drying continuously while maintaining the reduced pressure is complex. Generation of the reduced pressure likewise demands a relatively large amount of energy.

WO 2007/147181 A1 discloses a process and a system for thermal processing of moist material, in particular sewage sludge, having a plurality of drying stages. In this case, at least one high-temperature drying and one low-temperature drying are provided, wherein the waste heat of the high-temperature drying is used for heating the low-temperature drying. The low-temperature drying can be constructed as belt drying. The exhaust air conduit of the high-temperature dryer can be connected, optionally via a heat exchanger (17), for example a condenser, to the circulating air conduit of the low-temperature dryer. By connecting together two different drying processes and matching the operating parameters, the waste heat of the high-temperature process can cover the energy requirement of the low-temperature process. The high-temperature drying can be constructed as fluidized-bed drying. The condenser is operated at a temperature between 50 and 95° C. in order to offer a meaningful temperature level for uncoupling energy to the belt dryer.

DE 10 2004 051 975 B3 discloses a process for drying sewage sludge in which the moist sewage sludge that is to be dried is introduced into a sewage sludge drying appliance. In this case, low-temperature waste heat having a low temperature of 50 to 200° C. is uncoupled from an ORC system that is connected downstream of a heat source, e.g. a biomass furnace, and is then fed as a low-temperature heat stream to the sewage sludge drying appliance for a time period such that the sewage sludge is thermally dried to a dry matter content of at least 50%. In the sewage sludge drying appliance, at least one heat-exchange appliance can be provided, by means of which the low-temperature waste heat of the low-temperature heat stream that is fed via the at least one low-temperature flow conduit heats an air stream for generating a warm air stream. The warm air stream then removes the moisture from the sewage sludge uniformly distributed on a drying belt. The drying exhaust air from the sewage sludge drying appliance which has a temperature roughly of 20° C. to 70° C. can then in turn be fed to the biomass furnace, which increases the overall efficiency of the system. The drying exhaust air can be conducted via a heat exchanger, through which in turn flue gas flows, as a result of which the drying exhaust air is heated to approximately 50° C. to 100° C.

The drying exhaust air, at the cited temperature of 20° C. to 70° C., has a volume of such a size that only a relatively small fraction thereof can be fed to the biomass furnace, because this requires much less air for the combustion than is produced as drying exhaust air. A large part of the energy present in the drying exhaust air is lost in this process.

The object of the present invention is to indicate an alternative process for drying sludge that is simple to carry out, less susceptible to faults and is energy-efficient, and also a method suitable for carrying out the process.

According to the invention a process is provided for drying sludge having the following steps:

a) applying a sludge having a dry matter content of 15% to 30% to a floor of a drying hall or to sludge already present there, b) predrying the sludge in the drying hall (10), wherein the sludge is mixed, in particular continuously, c) introducing at least a part of the predried sludge into a heated thermal dryer, wherein the sludge introduced in each case into the thermal dryer is replaced in the drying hall by a sludge having a dry matter content of 15% to 30% by carrying out step a), which sludge then likewise passes through step b), d) drying the sludge in the thermal dryer to a dry matter content of 80% to 95%, wherein air taking up moisture from the sludge flows over or through the sludge, wherein the air is brought to a temperature in a range from 70° C. to 160° C., or wherein, by heating the sludge, water vapor is liberated from the sludge, wherein the sludge, after achieving the dry matter content of 80% to 95%, is discharged from the thermal dryer, wherein the sludge discharged from the thermal dryer in each case is replaced by predried sludge by carrying out step c), which predried sludge then likewise passes through step d), e) passing the air heated in step d), or the water vapor, through a first region of a heat exchanger, through which, in a second region, ambient air or water or another liquid medium flows, wherein the air heated in step d) or the water vapor, with condensation of the moisture present therein, releases heat to the ambient air, or the water, or the other liquid medium, wherein the heated air or the water vapor is cooled to a temperature in the range from 10° C. to 60° C., and the ambient air or the water or the other liquid medium is heated to a temperature of at most 50° C. which is at most 40 K above the ambient temperature and f) promoting the predrying according to step b) by introducing the ambient air or the water or the other liquid medium heated in step e) into the drying hall, in such a manner that the ambient air flows on or above the surface of the sludge applied to the floor of the drying hall, or the water or the other liquid medium flows through at least one heating conduit in the floor of the drying hall and thereby heats the floor, wherein an increase or decrease in the pressure of the air, the water vapor or the ambient air in the overall process serves solely for transporting the air, the water vapor or the ambient air. A structurally complex provision of a low pressure or exposure to vacuum, as is known from DE 196 44 465 C2, is dispensed with in the process according to the invention.

Sludge having a dry matter content from 15% to 30% can be achieved, for example, by mechanical dewatering of sludge having a lower dry matter content. The mechanical dewatering can proceed either in the region of or in the immediate vicinity of the drying hall, or in the region of or in the immediate vicinity of a sewage works. Transport of sewage sludge dewatered at a sewage works to the drying hall can proceed, e.g., by means of a motor truck. The mechanical dewatering can proceed, for example, by means of a centrifuge, or by means of expression of the water from the sludge.

A drying hall here is taken to mean an enclosed area, wherein the area forms the floor of the drying hall. The drying hall can be a classical hall, into which, for example, a wheel loader can be driven, or else an area which is enclosed by a lower, e.g. maximum 1.5 m in height, building shell.

The thermal dryer is a dryer which is heated by supplying energy. For example, it can be heated by means of the waste heat of a combined heat and power plant, by combustion of fossil fuels, or by means of electricity. The water vapor released from the sludge in step d) can have a temperature from 100° C. to 160° C., in particular 100° C. to 150° C., in particular 100° C. to 140° C., in particular 100° C. to 135° C., in particular 100° C. to 130° C. The air in step d) in the thermal dryer is generally circulated. From this circuit, in the thermal dryer, in step e), a part of the heated air that is moistened by the sludge, after it flows over or through the sludge, for example 10 to 20% of the circulating air volume, is branched off, and replaced by, in particular preheated, ambient air. The air which is branched off is passed in step e) through the first region of the heat exchanger. Gradually, in this manner, at least substantially all of the air heated in step d) is passed through the first region of the heat exchanger.

A great advantage of the process according to the invention is that it permits, with relatively low structural expenditure, an uninterrupted operation of the thermal dryer, and makes possible multiple use of a relatively high fraction of the energy used for the thermal dryer. Drying in the drying hall proceeds at a relatively low temperature. This drying, in the process according to the invention, is already supported by a relatively minor heating of the ambient air or of the water or of the other liquid medium in step e) to a temperature of at most 50° C., wherein the temperature is only at most 40 K above the ambient temperature. The ambient temperature in this case is generally the temperature in the surroundings and the ambient air is air from the surroundings of the drying hall and of a building surrounding the thermal dryer. Surroundings can be taken to mean a region of 0 m to 100 m, in particular 0 m to 50 m, distance from the drying hall or from the building surrounding the thermal dryer. It is possible for the process according to the invention to be carried out usefully at an ambient temperature from −30° C. to +40° C., in particular −30° C. to +30° C.

Owing to the relatively low temperature of 10° C. to 60° C. to which the air or the water vapor from the thermal dryer is cooled, despite the low temperature level, a relatively large amount of condensation energy is transferred to the ambient air or the water or the other liquid medium. As a result, a high heat recovery quotient is achieved, which is the greater, the lower the temperature of the ambient air, of the water or of the other liquid medium is. Therefore, carrying out the process according to the invention with ambient air in winter is particularly energy efficient. Utilization of the condensation energy of the heated air or of the water vapor from the thermal dryer does not take place in the process known from DE 10 2004 051 975 B3. Where this drying exhaust air is conducted via a heat exchanger, this serves for heating the drying exhaust air to 50 to 100° C. by means of flue gas, but not for further cooling the drying exhaust air. Owing to the condensation taking place during cooling in the air or in the water vapor, in addition, dust entrained from the thermal dryer is deposited, such that the air or the water vapor can then be directly fed to a biofilter, without further dust removal, without this biofilter being clogged by dust.

The combination of the thermal drying with predrying on a relatively large area in the form of the floor of the drying hall, at a temperature which is only at most 40 K above the ambient temperature, allows useful utilization of a relatively low temperature level in the heat exchanger. The heat exchanger can, as a result, still be usefully operated in a low temperature range, in which operation of the heat exchanger known from WO 2007/147181 A1 is no longer useful, because at this temperature level a simple low-temperature drying without utilizing the relatively large area is not cost-efficient. Owing to the combination of the thermal dryer with drying in a drying hall, a synergistic effect is produced, which permits the utilization of a greater fraction of the energy used in the thermal dryer than the process known from WO 2007/147181 A1, because in the process according to the invention, the air heated in the thermal dryer is cooled to a lower temperature level. Owing to the combination, a larger fraction of the energy used in the thermal dryer can be used for drying than in other known processes.

The process according to the invention as well as the process known from DE 10 2004 051 975 B3 relate to a low-temperature drying which, however, in contrast to the known process, utilizes a large fraction of the energy used in the thermal dryer efficiently for a predrying. Up to about 70% of the energy used for the thermal dryer can be used for supporting the drying in the drying hall. The specific energy requirement for carrying out the process according to the invention is about 30 to 70% lower than the specific energy requirement for carrying out a classical thermal drying process.

In contrast to the process known from DE 196 44 465 C2, in the process according to the invention, neither the creation of a vacuum nor compression is necessary for condensation of the moisture. In the process according to the invention, the condensation is performed only by cooling the moisture-containing air or the water vapor in the heat exchanger, which also acts as a condenser in this case. The ambient air flowing through the second region of the heat exchanger is air from outside the drying hall and outside the thermal dryer. By means of this process, not only can the heat liberated by condensation, but also the sensible heat of the moisture-containing air or of the water vapor from the thermal dryer can be used, without a high temperature level or a high expenditure in terms of apparatus being required for this purpose. In combination with the drying in the drying hall proceeding at a relatively low temperature, in which the sludge has a relatively large surface area, heating of the ambient air by a very few degrees Celsius is already sufficient in order to achieve a drying action and to be able to utilize the energy usefully.

A further advantage of the process according to the invention is a partial self-regulation. If, for example, the dry matter content of the sludge predried according to step b) falls, the downstream thermal dryer must vaporize more water and uses more energy. As a result, the air flowing over or flowing through the sludge in the thermal dryer in step d) also takes up more energy and gives this off in the heat exchanger. As a result, the ambient air or the water or other liquid medium in the second region of the heat exchanger is heated by a higher amount, or a larger amount of the ambient air or of the water or other liquid medium is heated. In both cases, this effects a rise in the dry matter content of the sludge predried according to step b) until an equilibrium is established.

The energy from the thermal dryer can be used with a particularly low technical expenditure, when the air heated in the thermal dryer or the water vapor gives off heat to the ambient air. A further advantage of the transfer to ambient air is that, in the case of falling ambient temperature, for example in winter, the heated air originating from the thermal dryer, or the water vapor in the first region of the heat exchanger is further cooled than at a higher ambient temperature, because the ambient air need only be heated by a few K above the ambient temperature, in order to be suitable for promoting the predrying. As a result, a larger fraction of the moisture present in the heated air can be condensed in the heat exchanger and therefore more heat of condensation can be utilized. As a result, the heat recovery quotient increases.

In order that at the end of the drying operation, the desired dry matter content is achieved, the dry matter content of the sludge discharged from the thermal dryer can be measured. According to requirements, more or less energy can then be supplied to the thermal dryer. If the thermal dryer is constructed as a belt dryer, the belt advance can also be reduced, in such a manner that the sludge remains for a longer time in the thermal dryer, if no more energy can be fed to the dryer, and the desired dry matter content is not yet achieved. If the thermal dryer is operated with waste heat, for example from a combined heat and power plant, if necessary an additional heating device can also be connected to cover peak loads.

The combination of predrying the sludge on the floor of the drying hall with drying in a conventional thermal dryer also offers great advantages with respect to fault-free, and in particular automated, operation. If the sludges that are to be dried originate in the form of sewage sludge from differing sewage treatment plants, the sludges can have a highly variable dry matter content. The dry matter content achievable by mechanical dewatering is likewise variable. It depends on the sludge composition, the waste water purification technique, the mechanical dewatering process and the temperature at which the waste water is produced and a sewage treatment plant is operated. The lower this temperature is, the poorer the sludge may generally be dewatered, because the lower the temperature is, the fewer organic components of the waste water are reacted in the sewage treatment plant.

Sludges which are produced with fluctuating dry matter contents may be handled only with difficulty in a conventional thermal dryer for technical and economic reasons. For this purpose, during operation, in each case the starting dry matter content would have to be determined, and, depending thereon, the parameters would have to be established with which the thermal dryer is operated. However, in practice, this is scarcely able to be achieved, or only with great effort, for example by providing a specialist worker who subjectively estimates the starting dry matter content and controls the thermal dryer. Via the predrying in the drying hall, however, it is possible for sludge always to be fed to the thermal dryer with a relatively constant dry matter content. Substantially, this is achieved by the drying hall acting as a buffer in which mixing the sludge evens out the dry matter content of the sludge. As a result, by means of the process according to the invention, even sludge introduced into the drying hall with greatly fluctuating dry matter content can be handled without problem, without faults occurring thereby, as may be found, for example, in the process known from WO 2007/147181 A1. By equalizing the dry matter content in the predrying and the possibility of working with differing starting dry matter contents of the sludge in the range from 15% to 30%, using the process according to the invention, it is possible to dry all year round in a weather-independent manner, and to provide sludge having a dry matter content of about 90%.

A further advantage associated with the predrying on the floor of the drying hall with respect to fault-free operation is that, during application of the sludge on the floor, large foreign bodies or interfering matter may be readily recognized and eliminated. This is advantageous, in particular, when the process according to the invention is carried out centrally for a plurality of sewage treatment plants and the sludge that is to be dried is brought by motor trucks to the drying hall, because foreign bodies or interfering matter from the loading areas of the motor trucks from previous uses again and again arrive in the sludge.

The reliability of the process can be increased by the sludge being dried by the predrying to the extent that it is free-flowing. As a result, the sludge can be screened through a, in particular coarse-mesh, grating to eliminate foreign bodies or interfering matter between steps b) and c). The susceptibility to faults of the process can be considerably reduced thereby with a low expenditure.

Application on the floor can be performed, for example, by means of a wheel loader. In order to achieve good accessibility, for example, for removing foreign bodies or interfering matter, the sludge can be applied on the floor in a very thin layer, for example of 5 to 20 cm thickness. A frequently occurring problem in thermal dryers is that the sludge, before the drying in the thermal dryer, is stored temporarily in a bunker, on the floor of which is arranged a feed appliance for feeding the sludge to the thermal dryer, for example in the form of a screw conveyor or a moving floor. The feed appliance can be readily blocked by foreign bodies or interfering matter and as a result cause a downtime of the system. In the case of a bunker for temporary storage of the sludge, this is frequently filled up to a height of 2 to 3 meters with sludge. This sludge, in the case of the feed appliance being blocked, must be excavated from the bunker and stored temporarily in order to eliminate the fault.

Even if the fault does not lead to a blocking of the feed appliance, the foreign bodies or interfering matter can damage the thermal dryer. In particular, when the thermal dryer is constructed as a belt dryer, sharp-edged foreign bodies or interfering matter can readily lead to damage of the conveyor belt. The easy recognizability, good accessibility and easy removability of interfering matter or foreign bodies during predrying in the drying hall eliminate this disadvantage in the process according to the invention. In contrast to a dryer operated solely by means of incoming solar radiation, the space requirement for a dryer operated by the process according to the invention is considerably smaller.

In conventional thermal dryers, there is a problem that the total carbon content of the exhaust air is relatively high, and therefore, for example provisions of the German Federal Air Pollution Control Regulation are frequently contravened. However, owing to the predrying, the sludge, before entry into the thermal dryer, is put into a stable aerobic state, as result of which outgassing of methane is avoided or at least markedly reduced.

In an embodiment of the process according to the invention, the drying hall has a device for air heating by means of solar radiation, in particular a solar collector constructed as an air collector.

Alternatively, the drying hall can be constructed in a greenhouse manner and have a substantially transparent building shell. The sludge then is predried utilizing solar radiation radiating into the air collector or into the drying hall. Utilization of the solar radiation further supports the drying in the drying hall. As a result, promotion of the predrying by introducing the ambient air heated in step e) according to step f) is possible with a still lower heat supply than without utilizing the irradiant solar radiation. The synergistic effect which exists anyway owing to the combination of the thermal dryer with the drying hall, is further reinforced, and the specific energy requirement is further decreased.

The process according to the invention can be embodied in such a manner that the ambient air or the water or the other liquid medium is heated when step e) is carried out to a temperature of below 50° C., in particular below 40° C., in particular below 35° C., in particular at most 30° C. When step e) is carried out, the temperature can be at most 30 K, in particular at most 20 K, in particular at most 10 K, above the ambient temperature. The condensate formed when step e) is carried out can have a temperature of at most 60° C., in particular at most 50° C., in particular at most 45° C., in particular at most 35° C. Via this low temperature level of the condensate and therefore also of the heat exchanger or the condenser, good utilization of the heat liberated during the condensation is ensured. The lower the temperature of the heat exchanger or the condenser is, the more heat of condensation can be utilized. This advantage applies in particular when the process according to the invention is carried out using ambient air in winter.

In one embodiment of the process according to the invention, the sludge, when step c) and/or step d) is carried out, is moved on an, in particular air-permeable, conveyor belt. The thermal dryer is what is termed a belt dryer. This facilitates a completely automated operation. For example, the residence time of the sludge in the thermal dryer and thus the dry matter content achievable in the thermal dryer can be controlled via the speed with which the conveyor belt moves the sludge through the thermal dryer.

In a further embodiment of the process according to the invention, when step d) is carried out, air flows from top to bottom through the sludge. The flow of air through the sludge is more efficient than simple flow of air over the sludge. A flow of air through the sludge from top to bottom, compared with a flow through the sludge from bottom to top, has the advantage that as a result no particles of the sludge are vortexed up, because loose particles are thereby forced in any case onto the bottom layer. If the sludge in this case is moved on a conveyor belt, the conveyor belt, to maintain permeability, has small openings or pores.

The sludge can be in particular mechanically dewatered sewage sludge.

Condensate formed in the condensation according to step e) can be used for heating the floor of the drying hall. For this purpose, a liquid conduit can be passed through the floor of the drying hall, through which conduit the condensate is passed. Alternatively, or additionally thereto, the condensate formed in the condensation according to step e) can be used for moistening a biological filter for purifying exhaust air formed in the process and/or for moistening exhaust air from the drying hall. Biological filters normally consist of a biological support material on which the microorganisms live. In order that the support material does not dry out, constant moistening is necessary. By using the condensate formed in step e), it is possible to operate the process in such a manner that no waste water, or only very little waste water, is formed, and at the same time no additional water is necessary for moistening the biological filter. A waste water-free process is advantageous, in particular, if no sewage treatment plant is available for receiving the waste water. Moistening the biological filter can be achieved, for example, by spraying the condensate formed according to step e). In order to spare the microorganisms living in the biological filter or, on moistening the exhaust air, a material contacting the exhaust air or the environment, or on heating the floor of the drying hall, the liquid conduits, the pH of the condensate can be lowered by adding an acid to the condensate. The condensate otherwise frequently has a very high pH, in particular as a result of ammonium ions present therein.

In a further embodiment of the process according to the invention, the drying hall and the thermal dryer are components of a building or are spaced apart from one another less than 20 m, in particular less than 10 m. As a result, the thermal losses between drying hall and dryer may be minimized. Further utilization of heat produced during operation of the thermal dryer is possible in that further air directly surrounding the thermal dryer and heated by the thermal dryer, e.g. from a building surrounding the thermal dryer, is likewise introduced into the drying hall, in such a manner that the further air flows on or over the surface of the sludge applied to the floor of the drying hall. Since thermal dryers always heat the surrounding air, the heat which is otherwise lost unutilized can be used for drying the sludge.

In a further embodiment of the process according to the invention, the drying hall also serves for receiving and storing sludge having a dry matter content of 15% to 30%, and/or for storing sludge that is predried according to step b). Here, this can be sludge which, e.g., because of insufficient capacity of the thermal dryer, or because of maintenance work to the thermal dryer, cannot be immediately predried in the drying hall, or dried in the thermal dryer. As a result, the drying hall acts as a buffer for the sludge to be dried by the thermal dryer. This is also advantageous, because the cost efficiency of the thermal dryer is particularly high when it is operated with a relatively constant amount of sludge per unit of time. This is difficult to ensure, in particular during operation of a conventional thermal drying device, which is supplied with sludge by a plurality of sewage treatment plants, without intermediate storage, because the sludge that is to be dried is not usually produced at a constant rate per unit time. Reasons for this can be logistical problems, holidays and faults, e.g. in the operation of a supplying sewage treatment plant. In addition, storage can be necessary when maintenance work must be carried out on the thermal dryer. For sludge reception and storage, therefore, customarily, in any case a storage space or bunker as large as possible is necessary. The space requirement which additionally results via the drying hall is therefore small if the drying hall is also used for reception and storage of the sludge and no separate storage space is provided therefor. Frequently occurring logistical problems in sludge reception can thereby be avoided without additionally needing to provide a sludge reception facility.

The process according to the invention has proved to be particularly energy efficient when the sludge, during the predrying, is heated to a maximum temperature of below 50° C., in particular a maximum temperature of 20° C. to 40° C.

The sludge, when step b) is being carried out, can be predried to a drying matter content of 25% to 70%, in particular 40% to 60%, in particular 50% to 60%. If the sludge, after the predrying has a dry matter content below 50%, this sludge lies frequently in what is termed the glue phase. This is difficult to handle in the thermal drying because such a sludge sticks to surfaces contacting it, for example in the form of the belt of a belt dryer. In order to get round this, sludge in the glue phase is frequently, before introduction into a thermal dryer, mixed with previously dried sludge having a higher dry matter content, and only then introduced into the thermal dryer. The further the dry matter content is beneath 50%, the greater the amount of previously dried sludge to be admixed is, and therefore also the greater the amount of sludge which is conducted several times through the thermal dryer. This gives rise to additional costs and an increased wear of the device used for carrying out the process. In the process according to the invention and a predrying of the sludge to a dry matter content of at least 30%, substantially less dried sludge needs to be admixed to avoid the glue phase than is usual in the prior art. As a result, the amount of sludge passing repeatedly through the thermal dryer, the energy expenditure for drying and wear of the device used for carrying out the process are reduced.

In a particularly energy-efficient implementation of the process according to the invention, the air, when step d) is being carried out, is brought to a temperature in a range from 90° C. to 150° C., in particular 90° C. to 130° C., in particular 90° C. to 110° C. The air or the water vapor, when step e) is being carried out, can be cooled to a temperature in the range from 10° C. to 50° C., in particular 10° C. to 40° C. The further the air or the water vapor is cooled, the more condensation energy is released in the form of heat to the ambient air or the water or the other liquid medium, and the more energy is recovered.

When, during carrying out step e), the air or the water vapor is cooled to a temperature in the range from 25° C. to 40° C., the air or the water vapor can thereafter be directly passed through a biological filter or the biological filter. At this temperature, the biological filter operates particularly efficiently, and the microorganisms present therein are not damaged.

A further increase in the energy efficiency of the process according to the invention is possible, wherein, after step d) has been carried out, ambient air is used for cooling the applied sludge, in particular to a temperature which is at most 25 K, in particular at most 20 K, above the ambient temperature, and the ambient air that is heated thereby is likewise introduced into the drying hall in such a manner that the heated ambient air flows on or over the surface of the sludge that is applied to the floor of the drying hall.

In addition, a part of the sludge applied according to step d), between steps b) and c) can be mixed with sludge that is predried according to step b). As a result, the handling of sludge can be improved which, after carrying out step b), has a drying matter content of less than 50%, and as a result is very sticky.

In an embodiment of the process according to the invention, exhaust gas resulting from a combustion taking place, in particular, in a turbine or another combustion engine, in particular in a combined heat and power plant, is added to the air taking up moisture for heating according to step d), in particular to a temperature from 110° C. to 150° C. This permits a very efficient utilization of the heat energy of the exhaust gas that is otherwise lost. Also, a coolant used for cooling the turbine or the other combustion engine can be used in a further heat exchanger for preheating the air taking up the moisture, in particular from the surroundings of the drying hall or the thermal dryer, for example to a temperature of about 80° C. This permits a very efficient utilization of the waste heat of a combined heat and power plant.

The invention further relates to a device for carrying out a process according to the invention, comprising
- a drying hall having a device for, in particular constantly, mixing sludge that is applied to the floor of the drying hall,
- a heated thermal dryer having a conveyor belt appliance for continuous transport of the sludge through the thermal dryer,
- a heat exchanger having a first region and a second region, wherein a heat exchange can proceed between the first region and the second region, a first conduit which connects the first region vapor- or air-conductingly to the thermal dryer, a second conduit which connects the second region air-conductingly to the surroundings, and a third conduit which connects the second region to the drying hall, and
- at least one device for transporting the vapor or the air and the ambient air in the first, second and third conduits.

The drying hall can in addition have a device for air heating by means of solar radiation, in particular a solar collector constructed as an air collector, or be constructed in the manner of a greenhouse, and have a substantially transparent building shell. Predrying the sludge can then proceed utilizing the solar radiation radiating into the air collector or the drying hall.

The device can in addition comprise a combined heat and power plant and a fourth conduit for the direct and indirect feeding of the exhaust gas resulting from operation of the combined heat and power plant to the thermal dryer. In addition, the device can comprise a further heat exchanger which, by means of a coolant of the combined heat and power plant, permits heating of air drawn in from the surroundings of the drying hall or of the thermal dryer for feeding to the thermal dryer. The turbine or the other combustion engine can be a gas turbine or a gas engine. The exhaust gases usually produced by the gas engine have a temperature in the range from 410° C. to 530° C. By admixture to the moisture-receiving air, the air can be heated by the exhaust gas to a temperature of 110° C. to 150° C. When the admixed exhaust gas ultimately leaves the drying hall and has here, for example, a temperature of 50° C., in the total process, about 90% of the resultant waste heat have been utilized in the combined heat and power plant. The exhaust gas pressure at the gas engine or gas turbine is preferably adjusted in such a manner that a device for transporting the exhaust gas is not required.

A liquid coolant of the gas engine can be utilized in the further heat exchanger in order to heat up the moisture-receiving air to a temperature of, for example, about 80° C.

The invention is described in more detail hereinafter with reference to an exemplary embodiment and a FIGURE.

The single FIGURE shows a schematic presentation of a drying system according to the invention having a greenhouse-like drying hall 10 having a substantially transparent building shell, a thermal dryer 12, and a combined heat and power plant 34 operated with fuel 32, in particular gas, and ambient air 16. To operate the system, first mechanically dewatered sludge is applied to the floor of the greenhouse-like drying hall 10 and there predried with utilization of solar radiation radiating into the drying hall. The predried sludge is then introduced into the thermal dryer 12, while the area liberated thereby on the floor of the drying hall is again covered with new sludge. In the thermal dryer 12, and between the thermal dryer 12 and the mixing device 30, moisture-receiving air 14 circulates. This air is firstly heated by admixture of exhaust gas 36 formed in the combined heat and power plant 34. At the same time, ambient air 16 is preheated in the further heat exchanger 28 by the cooling liquid 38 of the combined heat and power plant and the heated ambient air 18 is likewise added to the air 14 in the mixing device 30. The air 14 that is heated in this manner is passed through the sludge in the thermal dryer. A part of the circulating air 14 is branched off and used in the heat exchanger 17 to preheat ambient air 16, which then is passed as heated ambient air 18 into the drying hall 10 and there onto the surface of the sludge. After taking up moisture, this air leaves the drying hall 10 as exhaust air 22. The exhaust air 22 can be released into the environment directly or via the filter 24. The condensate 20 formed in the heat exchanger 17 is disposed of via a waste water purification device 26. Previously, a part of the heat present in the condensate 20 can be utilized for heating the floor of the drying hall 10. A part of the condensate can be used for moistening the filter 24 if it is constructed as a biological filter. The exhaust air 22 remaining after deposition of the condensate from the air 14 is passed through the filter 24.

The exhaust gas from the combined heat and power plant can have a temperature of 300° C. to 530° C. The cooling liquid 38 flow from the combined heat and power plant can have a temperature of about 90° C., and the cooling liquid 38 return, after passing through the further heat exchanger 28, can have a temperature of about 70° C. The ambient air 16 can have a temperature between −20° C. and +35° C. After passing through the further heat exchanger 28, it can be heated to a temperature of about 60° C. to 80° C. In the heat exchanger 17, the ambient air 16 is heated to about 10° C. to 40° C. The condensate formed therein can have a temperature between 25° C. and 45° C. The exhaust air 22 can have a temperature between 25° C. and 45° C. The air from the mixing device 30 which is fed to the thermal dryer 12 can have a temperature of about 110° C. to 150° C. The air 14 from the thermal dryer fed back to the mixing device 30 can have a temperature of about 50° C. to 80° C. The air leaving the thermal dryer in the direction of the heat exchanger 17 can have a temperature of about 50° C. to 80° C. The air humidity thereof is about 50 to 70%. The exhaust air 22 leaving the heat exchanger 17 has an air humidity of about 100%. Using the process described here, an energetic overall efficiency of greater than 80% is possible when operating the combined heat and power plant with a gas engine.

LIST OF REFERENCE SIGNS

10 Drying hall
12 Thermal dryer
14 Air
16 Ambient air
17 Heat exchanger
18 Heated ambient air
20 Condensate
22 Exhaust air
24 Filter
26 Waste water purification device
28 Further heat exchanger
30 Mixing device
32 Fuel
34 Combined heat and power plant
36 Exhaust gas
38 Cooling liquid

The invention claimed is:

1. A process for drying sludge having the following steps:
    a) applying a sludge having a dry matter content of 15% to 30% to a floor of a drying hall or to sludge already present there,
    b) predrying the sludge in the drying hall, wherein the sludge is mixed,
    c) introducing at least a part of the predried sludge into a heated thermal dryer, wherein the sludge introduced in each case into the thermal dryer is replaced in the drying hall by a sludge having a dry matter content of 15% to 30% by carrying out step a), which sludge then likewise passes through step b),
    d) drying the sludge in the thermal dryer to a dry matter content of 80% to 95%, wherein air taking up moisture from the sludge flows over or through the sludge, wherein the air is brought to a temperature in a range from 70° C. to 160° C., or wherein, by heating the sludge, water vapor at a temperature of 100° C. to 160° C. is liberated from the sludge, wherein the sludge, after achieving the dry matter content of 80% to 95%, is discharged from the thermal dryer, wherein the sludge discharged from the thermal dryer in each case is replaced by predried sludge by carrying out step c), which predried sludge then likewise passes through step d),
    e) passing the air heated in step d), or the water vapor, through a first region of a heat exchanger, through which, in a second region, ambient air flows, wherein the air heated in step d) or the water vapor, with condensation of the moisture present therein, releases heat to the ambient air, wherein the air or the water vapor is cooled to a temperature in the range from 10° C. to 60° C., and the ambient air is heated to a temperature of at most 50° C. which is at most 40° C. above the ambient temperature and
    f) promoting the predrying according to step b) by introducing the ambient air that is heated in step e) into the drying hall, in such a manner that the ambient air flows on or above the surface of the sludge applied to the floor of the drying hall,
    wherein an increase or decrease in the pressure of the air, the water vapor or the ambient air in the overall process serves solely for transporting the air, the water vapor or the ambient air.

2. The process as claimed in claim 1, wherein the drying hall has a device for air heating by means of solar radiation or is constructed in a greenhouse manner and has a substantially transparent building shell, wherein the sludge is predried utilizing solar radiation radiating into the air collector or into the drying hall.

3. The process as claimed in claim 1, wherein the ambient air is heated when step e) is carried out to a temperature of below 40° C.

4. The process as claimed in claim 1, wherein the temperature when step e) is carried out is at most 30° C. above ambient temperature.

5. The process as claimed in claim 1, wherein a condensate formed when step e) is carried out has a temperature of at most 60° C.

6. The process as claimed in claim 1, wherein the sludge, when step c) and/or step d) is carried out, is moved on a conveyor belt.

7. The process as claimed in claim 1, wherein, when step d) is carried out, air flows from top to bottom through the sludge.

8. The process as claimed in claim 1, wherein the sludge is sewage sludge.

9. The process as claimed in claim 1, wherein a condensate formed during the condensation according to step e) is used for heating the floor of the drying hall and/or for moistening a biological filter for purifying exhaust air formed in the process and/or for moistening exhaust air from the drying hall.

10. The process as claimed in claim 1, wherein the drying hall and the thermal dryer are components of a building or are spaced apart from one another less than 20 m.

11. The process as claimed in claim 1, wherein further air directly surrounding the thermal dryer and heated by the thermal dryer is likewise introduced into the drying hall, in such a manner that the further air flows on or over the surface of the sludge applied to the floor of the drying hall.

12. The process as claimed in claim 1, wherein the drying hall also serves for receiving and storing sludge having a dry matter content of 15% to 30%, and/or for storing sludge that is predried according to step b).

13. The process as claimed in claim 1, wherein the sludge, during the predrying, is heated to a maximum temperature of below 50° C.

14. The process as claimed in claim 1, wherein the sludge, when step b) is being carried out, is predried to a dry matter content of 25% to 70%.

15. The process as claimed in claim 1, wherein the air, when step d) is being carried out, is brought to a temperature in a range from 90° C. to 150° C.

16. The process as claimed in claim 1, wherein the air or the water vapor, when step e) is being carried out, is cooled to a temperature in the range from 10° C. to 50° C.

17. The process as claimed in claim 1, wherein the air or the water vapor, when step e) is being carried out, is cooled to a temperature in the range from 25° C. to 40° C., and is then passed through a biological filter or the biological filter.

18. A device for carrying out a process as claimed in claim 1 comprising
- a drying hall having a device for mixing sludge that is applied to the floor of the drying hall,
- a heated thermal dryer having a conveyor belt appliance for continuous transport of the sludge through the thermal dryer, wherein the thermal dryer is designed such that, therein, air taking up moisture from the sludge can flow over or through the sludge, wherein the air can be brought to a temperature in a range from 70° C. to 160° C., or that by heating the sludge, water vapor at a temperature of 100° C. to 160° C. can be released from the sludge,
- a heat exchanger having a first region and a second region, wherein a heat exchange can proceed between the first region and the second region, a first conduit which connects the first region vapor- or air-conductingly to the thermal dryer, a second conduit which connects the second region air-conductingly to the surroundings, and a third conduit which connects the second region to the drying hall, and
- at least one device for transporting the vapor or the air and the ambient air in the first, second and third conduits.

19. The device as claimed in claim 18, wherein the device additionally comprises a combined heat and power plant and a fourth conduit for the direct and indirect feeding of the exhaust gas resulting from operation of the combined heat and power plant to the thermal dryer.

20. The device as claimed in claim 19, wherein the device additionally comprises a further heat exchanger which, by means of a coolant of the combined heat and power plant, permits heating of air drawn in from the surroundings of the drying hall or of the thermal dryer for feeding to the thermal dryer.

* * * * *